(12) United States Patent
Hansen et al.

(10) Patent No.: US 10,876,415 B2
(45) Date of Patent: Dec. 29, 2020

(54) FAN BLADE TIP AS A CUTTING TOOL

(71) Applicant: UNITED TECHNOLOGIES CORPORATION, Farmington, CT (US)

(72) Inventors: James O. Hansen, Glastonbury, CT (US); Changsheng Guo, South Windsor, CT (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 627 days.

(21) Appl. No.: 14/623,670

(22) Filed: Feb. 17, 2015

(65) Prior Publication Data

US 2016/0362987 A1 Dec. 15, 2016

Related U.S. Application Data (60) Provisional application No. 62/007,567, filed on Jun. 4, 2014.

(51) Int. Cl.
*F02C 1/00* (2006.01)
*F01D 5/20* (2006.01)
(Continued)

(52) U.S. Cl.
CPC .............. *F01D 5/20* (2013.01); *F01D 5/288* (2013.01); *F01D 11/122* (2013.01); *F02C 3/04* (2013.01);
(Continued)

(58) Field of Classification Search
CPC .......... F01D 5/20; F01D 5/288; F01D 11/122; F02C 3/04; F02C 7/28; F04D 29/164;
(Continued)

(56) References Cited

U.S. PATENT DOCUMENTS

| 5,141,400 A * | 8/1992 | Murphy .................. F01D 5/288 416/229 R |
| 5,456,576 A | 10/1995 | Lyon |

(Continued)

FOREIGN PATENT DOCUMENTS

| CN | 1648416 A | 8/2005 |
| CN | 1940306 A | 4/2007 |

(Continued)

OTHER PUBLICATIONS

Anonymous: "Oblique, adj., N., and adv.", Oxford English Dictionary, Mar. 1, 2004, p. 3, XP055215973, Retrieved rom the Internet: http://www.oed.com/view/Entry/129718?result=1&rskey=QF9KIW &&print ; retrieved on Sep. 24, 2015; p. 3, paragraph A.I.2.b.
(Continued)

*Primary Examiner* — Theresa Trieu
(74) *Attorney, Agent, or Firm* — Cantor Colburn LLP (57) ABSTRACT

An airfoil for a gas turbine engine is disclosed. The airfoil may include a first side, and a second side opposite the first side. The first side and the second side may extend axially from a leading edge to a trailing edge and radially from a base to a tip. The tip may include an oblique surface between the first side and the second side.

10 Claims, 10 Drawing Sheets

(51) Int. Cl.
| | | |
|---|---|---|
| *F01D 5/28* | (2006.01) | |
| *F01D 11/12* | (2006.01) | |
| *F02C 3/04* | (2006.01) | |
| *F02C 7/28* | (2006.01) | |
| *F04D 29/16* | (2006.01) | |
| *F04D 29/32* | (2006.01) | |
| *F04D 29/38* | (2006.01) | |
| *F04D 29/52* | (2006.01) | |

(52) U.S. Cl.
CPC .............. *F02C 7/28* (2013.01); *F04D 29/164* (2013.01); *F04D 29/324* (2013.01); *F04D 29/325* (2013.01); *F04D 29/384* (2013.01); *F04D 29/526* (2013.01); *F05D 2220/32* (2013.01); *F05D 2240/55* (2013.01); *F05D 2300/611* (2013.01); *Y02T 50/60* (2013.01)

(58) Field of Classification Search
CPC .... F04D 29/324; F04D 29/325; F04D 29/384; F04D 29/526; F05D 2220/32; F05D 2240/55; F05D 2300/611; Y02T 50/672
USPC .... 60/772; 416/223 R, 229 R, 229 A, 241 R, 416/241 A
See application file for complete search history.

(56) References Cited

U.S. PATENT DOCUMENTS

| 5,476,363 A | * | 12/1995 | Freling | .................. | F01D 5/20 |
| | | | | | 416/223 A |
| 5,486,096 A | * | 1/1996 | Hertel | .................. | F04D 29/324 |
| | | | | | 416/229 A |
| 2007/0077149 A1 | * | 4/2007 | Lejars | .................. | F01D 5/20 |
| | | | | | 416/223 R |
| 2010/0232943 A1 | | 9/2010 | Ward et al. | | |
| 2012/0100000 A1 | * | 4/2012 | He | .................. | F01D 5/20 |
| | | | | | 416/223 R |
| 2014/0044553 A1 | | 2/2014 | Geppert et al. | | |

FOREIGN PATENT DOCUMENTS

| EP | 1764478 A2 | 3/2007 |
| EP | 1770244 A1 | 4/2007 |
| EP | 2309097 A1 | 4/2011 |
| EP | 2444592 A1 | 4/2012 |
| EP | 2514922 A2 | 10/2012 |
| EP | 2604798 A1 | 6/2013 |
| EP | 2696031 A1 | 2/2014 |
| FR | 370215 A | 2/1907 |
| GB | 2310897 A | 9/1997 |

OTHER PUBLICATIONS

European Search Report for EP Application No. 15170720.5 dated Oct. 1, 2015.
Chinese Office Action and Search Report for Chinese Application No. 201510301395.3 dated Nov. 27, 2017, 8 pages.
English Translation of Chinese Office Action and Search Report for Chinese Application No. 201510301395.3 dated Nov. 27, 2017, 9 pages.
English Translation for Second Office Action from the Chinese Patent Office for CN Application No. 201510301395.3 dated Jul. 23, 2018, 12 pages.
Second Office Action from the Chinese Patent Office for CN Application No. 201510301395.3 dated Jul. 23, 2018, 10 pages.
European Office Action Issued in EP Application No. 15170720.5, dated Jan. 2, 2020, 27 Pages.

* cited by examiner

FAN BLADE TIP AS A CUTTING TOOL

FIELD OF THE DISCLOSURE

This Application is a non-provisional patent application claiming priority under 35 USC § 119(e) to U.S. Provisional Patent Application Ser. No. 62/007,567 filed on Jun. 4, 2014.

FIELD OF THE DISCLOSURE

The present disclosure relates generally to gas turbine engines and, more particularly, to airfoils in a gas turbine engine.

BACKGROUND OF THE DISCLOSURE

Gas turbine engines may typically include a fan, a compressor, a combustor, and a turbine, with an annular flow path extending axially through each. Initially, the fan, which is powered by the turbine, draws ambient air into the engine. Part of the air flows through the compressor where it is compressed or pressurized. The combustor then mixes and ignites the compressed air with fuel, generating hot combustion gases. These hot combustion gases are then directed from the combustor to the turbine where power is extracted from the hot gases by causing blades of the turbine to rotate. The other part of the airflow from the fan is used to generate forward thrust.

A fan section of the gas turbine engine may include a plurality of blades extending radially from a central rotor. The plurality of blades may be circumferentially spaced apart around the rotor, and a fan casing may enclose the rotor and blades. Conventionally, a tip of the fan blade comprises a flat surface parallel to and in sealing contact with the fan casing. Reduction of a clearance distance between the fan blade tips and the fan casing has been known to increase an efficiency of the gas turbine engine.

To further minimize the clearance distance, the fan casing may include an abradable seal designed to abrade when the tips of the fan blades are rotating against the coating during operation. Fan blade tips may undergo treatment to increase the wear resistance of the blade tips, which rub against the abradable seal. To improve erosion resistance, the airfoil surfaces of the fan blade may be coated with an erosion resistant coating, such as, polyurethane.

However, during operation, the erosion resistant coating may degrade or peel off the fan blade due to excessive blade tip heating when the blade tips rub against the abradable seal. This has been determined to be caused by a combination of excessive heat generation by friction, the low thermal conductivity of the abradable material and high thermal conductivity of the blade material. Accordingly, there exists a need for a solution to reduce frictional heating between the blade tips and the abradable seal in order to eliminate the degradation of the erosion resistant coating.

SUMMARY OF THE DISCLOSURE

According to one embodiment, an airfoil for a gas turbine engine is disclosed. The airfoil may comprise a first side, and a second side opposite the first side. The first side and the second side may extend axially from a leading edge to a trailing edge and radially from a base to a tip. The tip may include an oblique surface between the first side and the second side.

In a refinement, the oblique surface may descend from the first side to the second side.

In another refinement, the oblique surface may descend from the second side to the first side.

In another refinement, the oblique surface may descend from a center to the first side, and the tip may include a second oblique surface descending from the center to the second side.

In another refinement, the tip may further include a flat surface between the first side and the second side.

In another refinement, the flat surface may be adjacent to the first side, and the oblique surface may descend from the flat surface to the second side.

In another refinement, the flat surface may be adjacent to the second side, and the oblique surface may descend from the flat surface to the first side.

In another refinement, the flat surface may be proximate a center of the tip, the oblique surface may descend from the flat surface to the first side, and the tip may further include a second oblique surface descending from the flat surface to the second side.

In another refinement, a width of the flat surface may be at least 2.54 mm (0.1 in).

In another refinement, a clearance angle of the oblique surface may be between zero to five degrees (0-5°).

According to another embodiment, a gas turbine engine is disclosed. The gas turbine engine may comprise a fan section, a compressor section downstream of the fan section, a combustor section downstream of the compressor section, and a turbine section downstream of the combustor section. At least one of the fan section, compressor section, and the turbine section may include a rotor, a plurality of airfoils extending radially from the rotor, and a case surrounding the rotor and the plurality of airfoils. Each of the plurality of airfoils may have a tip including a flat surface facing the case, and an oblique surface adjacent to the flat surface. The oblique surface may be angled away from the case.

In a refinement, the flat surfaces of the tips of the airfoils and the case may be in sealing contact.

In another refinement, the oblique surfaces of the tips of the airfoils may reduce frictional heating between the airfoils and the case during operation.

In another refinement, the case may include an abradable seal on an inner surface of the case.

In another refinement, the flat surface and the oblique surface on the tip of each of the airfoils may be designed to cut through the abradable seal of the case.

In another refinement, the tips of the airfoils may undergo treatment for increased wear resistance.

In another refinement, the flat surface of the tip may be adjacent to a pressure side of the airfoil.

In another refinement, a width of the flat surface may vary from a leading edge to a trailing edge of the airfoil.

According to another embodiment, a method for reducing frictional heating between airfoils and a casing of a gas turbine engine is disclosed. The method may comprise providing an oblique surface on a tip of each of the airfoils, the oblique surface being slanted away from the casing; and operating the gas turbine using the oblique surfaces.

In a refinement, the method may further comprise providing a flat surface in sealing contact with the casing, the oblique surface descending from the flat surface.

These and other aspects and features of the disclosure will become more readily apparent upon reading the following detailed description when taken in conjunction with the accompanying drawings. Although various features are disclosed in relation to specific exemplary embodiments of the invention, it is understood that the various features may be combined with each other, or used alone, with any of the various exemplary embodiments of the invention without departing from the scope of the invention.

While the present disclosure is susceptible to various modifications and alternative constructions, certain illustrative embodiments thereof will be shown and described below in detail. The invention is not limited to the specific embodiments disclosed, but instead includes all modifications, alternative constructions, and equivalents thereof.

DETAILED DESCRIPTION

Figure 1:
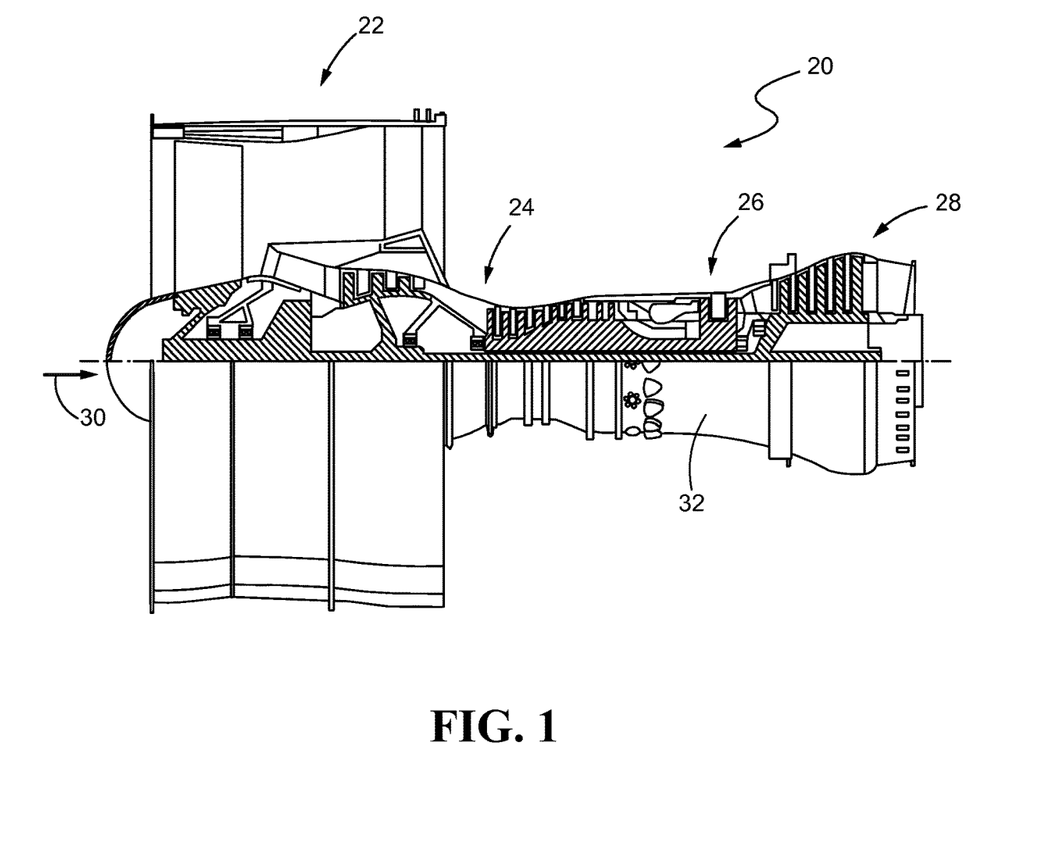
FIG. 1 is a cross-sectional view of a gas turbine engine, according to an embodiment of the present disclosure.

Referring now to the drawings, and with specific reference to FIG. 1, in accordance with the teachings of the disclosure, an exemplary gas turbine engine 20 is shown. The gas turbine engine 20 may generally comprise a fan section 22 which draws ambient air into the engine 20, a compressor section 24 where air is pressurized, a combustor 26 downstream of the compressor section which mixes and ignites the compressed air with fuel and thereby generates hot combustion gases, a turbine section 28 downstream of the combustor 26 for extracting power from the hot combustion gases, and an annular flow path 30 extending axially through each. A generally cylindrical engine casing 32 may circumscribe the fan section 22, compressor section 24, combustor section 26, and turbine section 28. Gas turbine engine 20 may be used on an aircraft for generating thrust or power, or in land-based operations for generating power as well.

Figure 2:
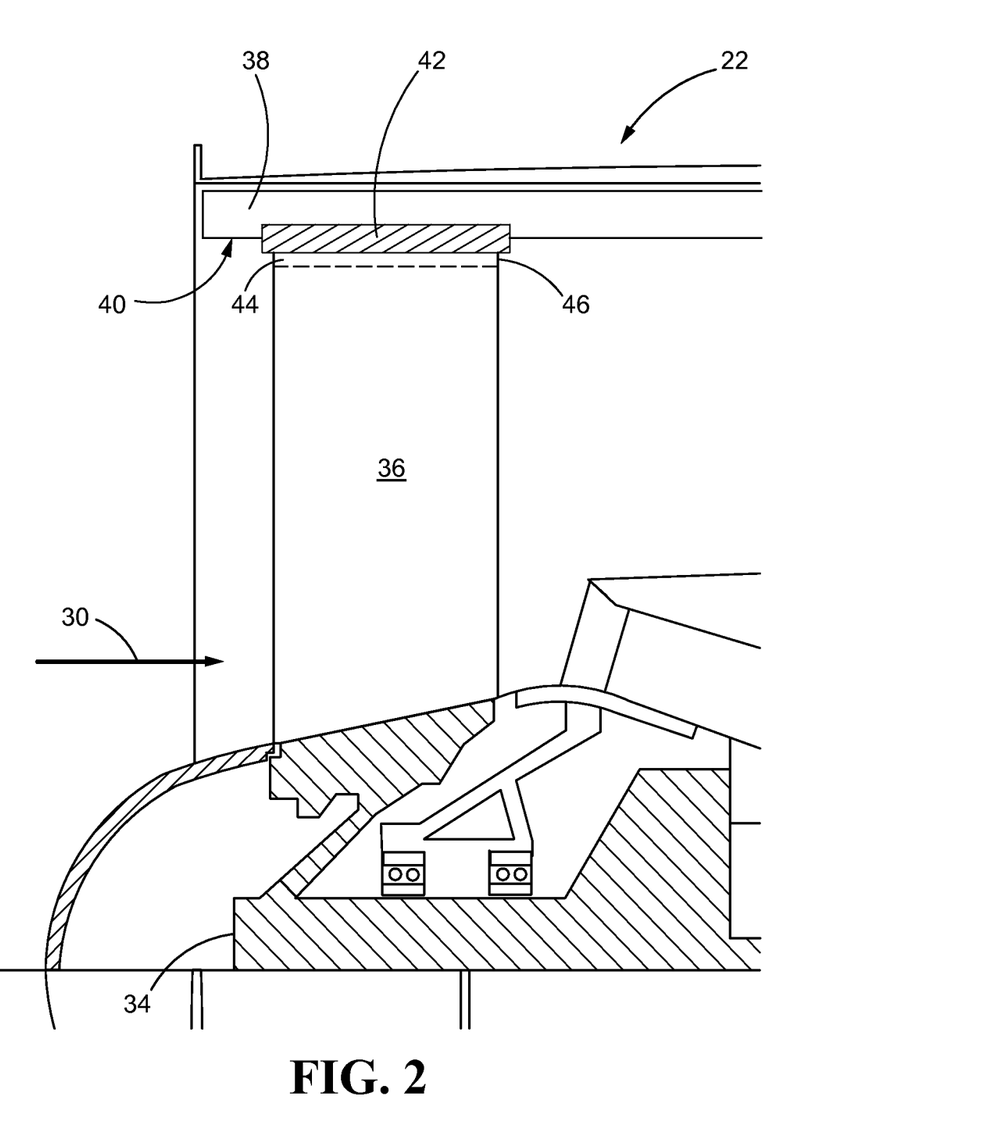
FIG. 2 is a cross-sectional view of a fan section of the gas turbine engine of FIG. 1.
Figure 3:
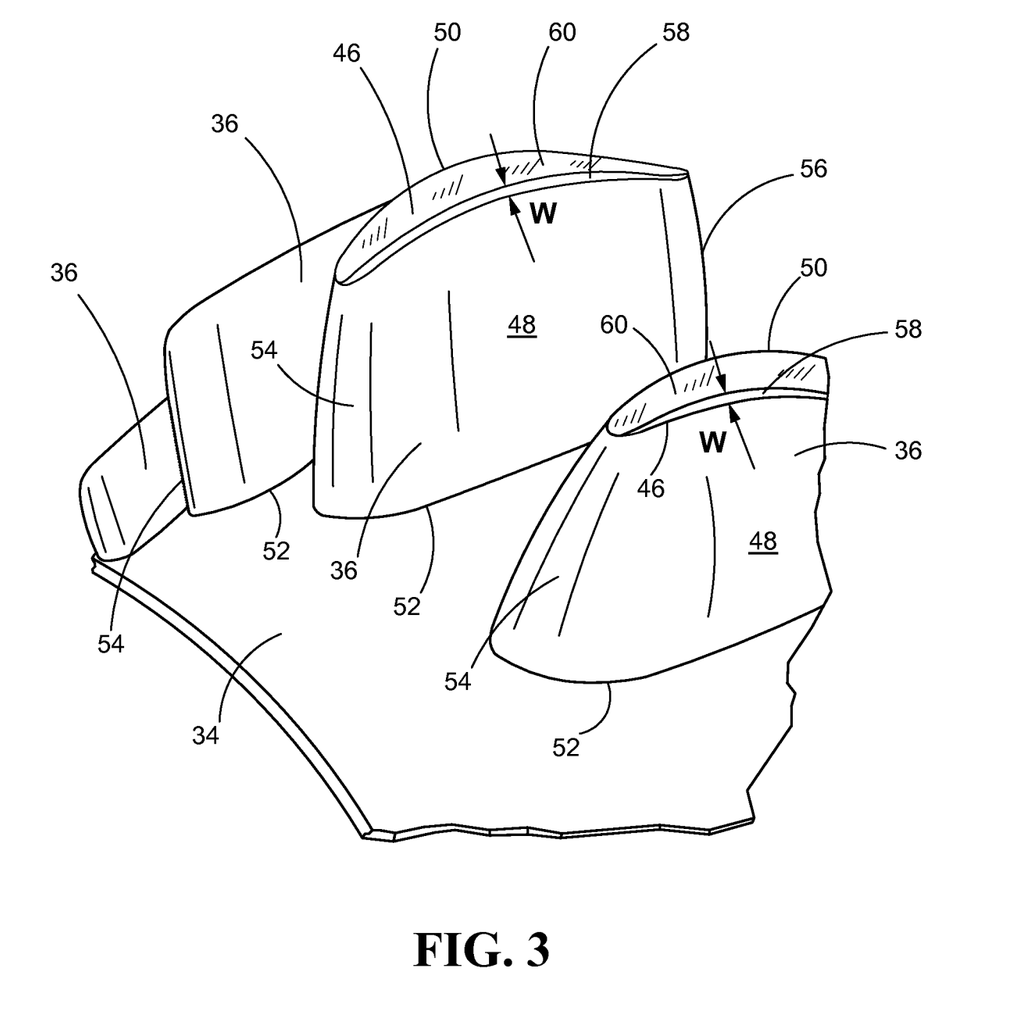
FIG. 3 is a perspective view of a plurality of airfoils, according to an embodiment of the present disclosure.
Figure 4:
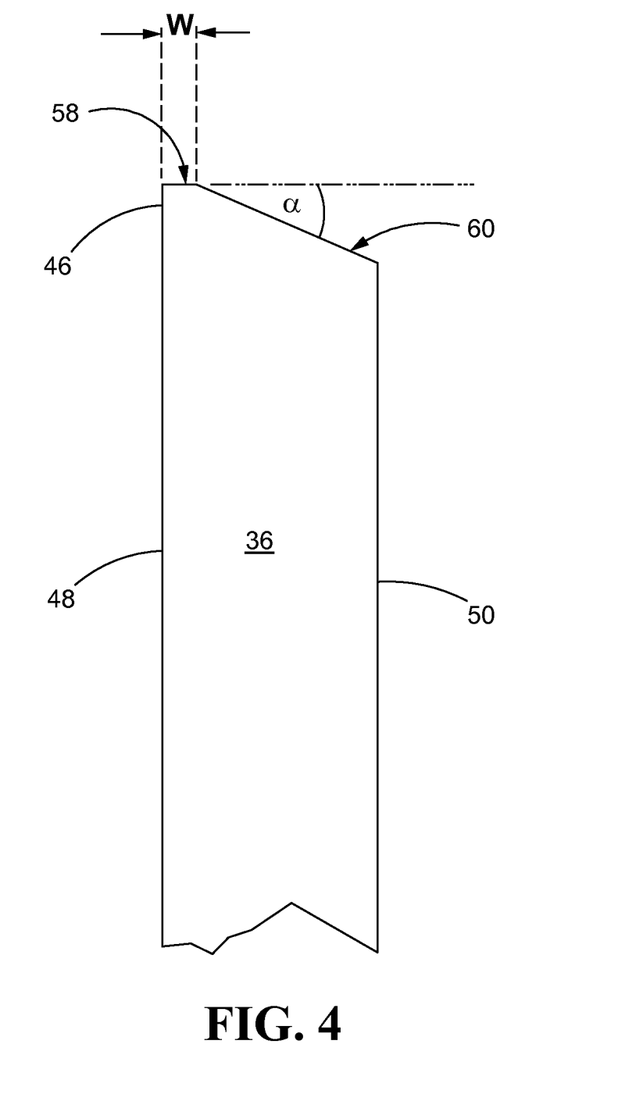
FIG. 4 is a cross-sectional view of one of the airfoils of FIG. 3.

Turning now to FIGS. 2-4, with continued reference to FIG. 1, the fan section 22 of the gas turbine engine 20 may comprise a rotor 34 and a plurality of airfoils 36 extending radially therefrom. The plurality of airfoils 36 may be circumferentially spaced apart around the rotor 34. The engine casing 32 may include a fan case 38 enclosing the fan section 22 and surrounding the rotor 34 and plurality of airfoils 36. On an inner surface 40 circumscribing the plurality of airfoils 36, the fan case 38 may include a rub strip or an abradable seal 42 to minimize a clearance distance between the airfoils 36 and the fan case 38. Furthermore, the seal 42 may be configured to abrade when the airfoils 36 rotate against the seal 42 during operation, thereby preventing wear of the airfoils 36. For example, the seal 42 may be a sprayed on abradable coating or a fabricated abradable seal.

In addition, the airfoils 36 may include a hard plating 44 (e.g., nickel plating, aluminum oxide plating, and the like) in order to enhance the wear resistance of the airfoils when rotating against the abradable seal 42. For example, a tip 46 of each of the airfoils 36 may undergo treatment for increased wear resistance, including but not limited to, anodizing, micro arc oxidation, cathodic arc deposition, and the like. It is to be understood that the abradable seal 42 may also be applied to the engine casing 32 surrounding airfoils of the compressor and/or turbine sections 24, 28, and that the airfoils in the compressor and/or turbine sections 24, 28 may also include a hard plating. Furthermore, to improve erosion resistance, the airfoil surfaces may be coated with an erosion resistant coating, such as, polyurethane.

As shown best in FIGS. 3 and 4, each airfoil 36 may comprise a first side 48 and an opposite second side 50 extending radially from a base 52 to the tip 46 and extending axially from a leading edge 54 to a trailing edge 56 (downstream of the leading edge 54). The airfoil 36 may have a camber with the first side 48 comprising a pressure side and the second side 50 comprising a suction side, although it is also possible that the airfoil 36 may have no camber. The airfoil 36 may be composed of, without limitation, aluminum, titanium, composite materials, and the like. It is to be understood that the airfoil 36 may comprise a fan blade in the fan section 22, as well as a rotor blade in the compressor section 24 and/or turbine section 28 of the gas turbine engine 20.

In order to effectively rub against the seal 42 without causing excessive heat generation by friction, the tip 46 of the airfoil 36 may be designed as a cutting tool against the seal 42. For example, the tip 46 may be beveled or chamfered. The tip 46 may include a flat surface 58 and an oblique surface 60. Facing the fan case 38, the flat surface 58 of the tip 46 may be in sealing contact with the abradable seal 42. While the flat surface 58 may be generally parallel to the inner surface 40 of the fan case 38, the oblique surface 60 may be angled away from (e.g., not parallel to) the abradable seal 42 on the inner surface 40 of the fan case 38.

For example, the flat surface 58 may be adjacent to the first side 48 or pressure side of the airfoil 36. Along the first side 48, a width W of the flat surface 58 may be a same or may vary from the leading edge 54 to the trailing edge 56. In one example, the width W of the flat surface 58 may be at least 2.54 mm (0.1 in) from the leading edge 54 to the trailing edge 56. However, the width W of the flat surface 58 may be greater or less than 2.54 mm (0.1 in) as well. Although the flat surface 58 may extend over an entire length of the airfoil 36 from the leading edge 54 to the trailing edge 56, the flat surface 58 may also extend only partially between the leading edge 54 to the trailing edge 56. For instance, proximate the leading and trailing edges 54, 56, there may not be a flat surface.

The oblique surface 60 may descend from the flat surface 58 on the first side 48 to the second side 50 or suction side of the airfoil 36 at a clearance angle $\alpha$. The clearance angle $\alpha$ may be between zero to five degrees (0-5°), although other angles are certainly possible. In so doing, the flat surface 58 of the tip 46 may abrade against the seal 42 during operation, while the clearance angle $\alpha$ and oblique surface 60 of the tip 46 may allow abraded material of the seal 42 to exit. Thus, the clearance angle $\alpha$ and oblique surface 60 may reduce a surface area in contact with the seal 42, thereby reducing frictional heating between the airfoils 36 and the fan case 38 or engine casing 32.

Figure 5:
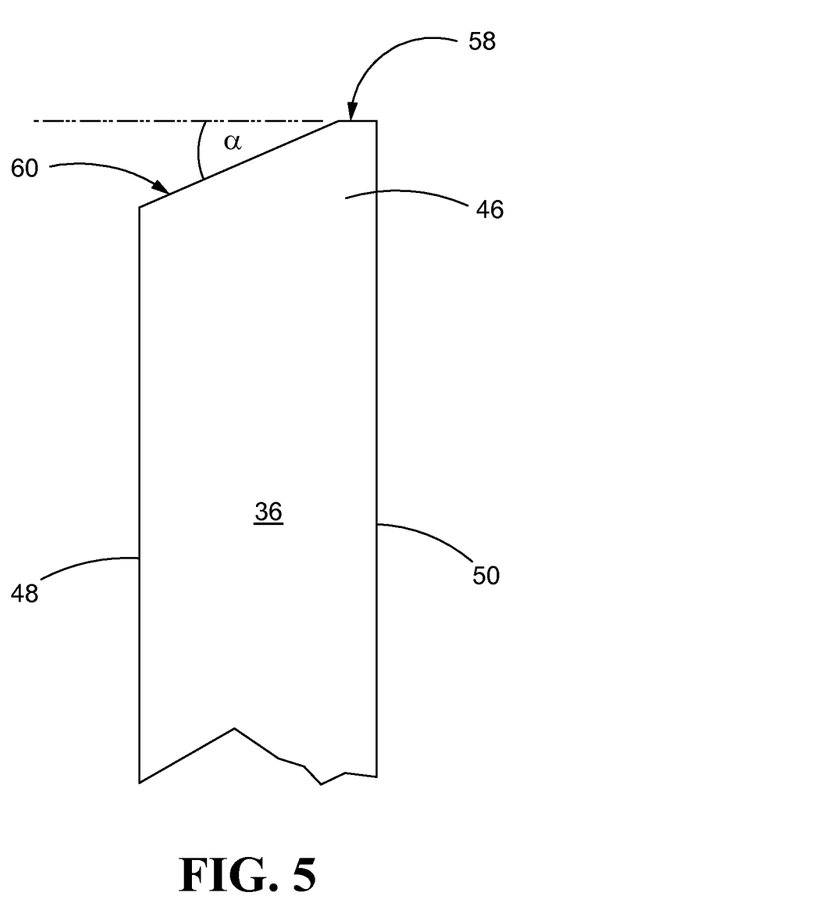
FIG. 5 is a cross-sectional view of an airfoil according to another embodiment of the present disclosure.
Figure 6:
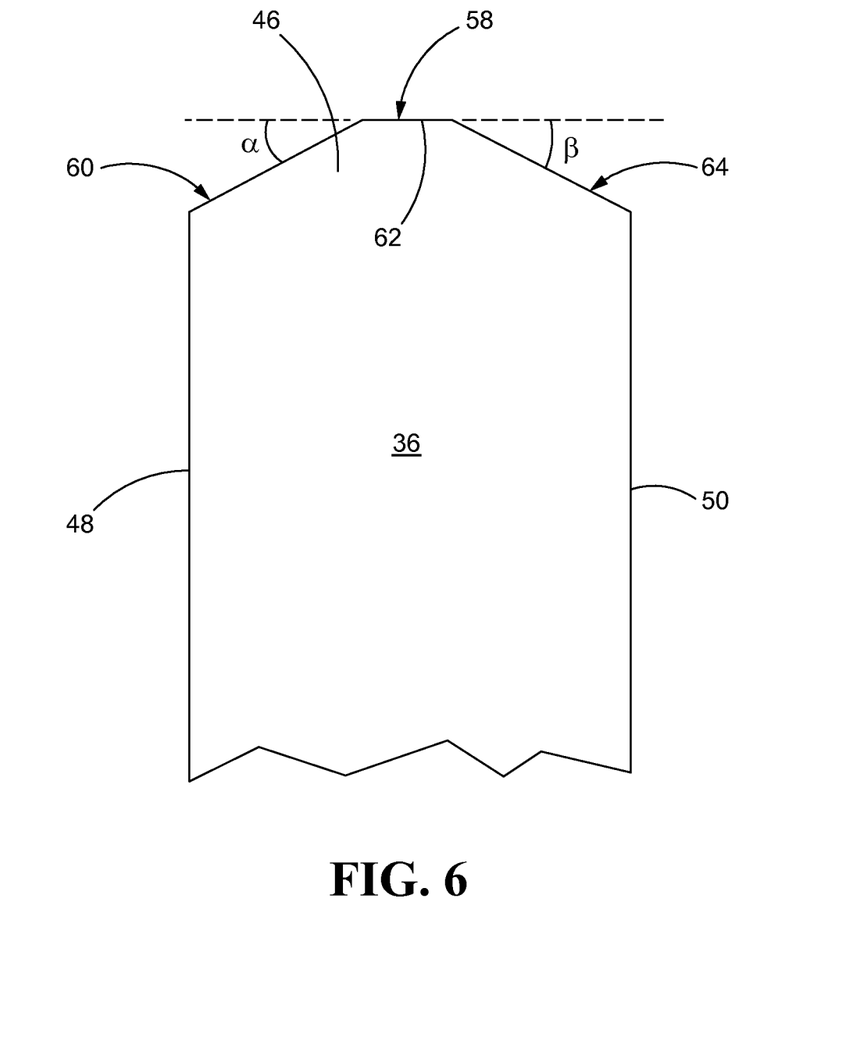
FIG. 6 is a cross-sectional view of an airfoil according to another embodiment of the present disclosure.

The flat surface 58 and the oblique surface 60 may be arranged in other configurations than that shown in FIGS. 3 & 4. For example, the flat surface 58 may lie anywhere between the first side 48 and the second side 50. As shown best in FIG. 5, the flat surface 58 may be adjacent to the second side 50 or suction side of the airfoil 36, and the oblique surface 60 may descend from the flat surface 58 on the second side 50 to the first side 48 at the clearance angle α. In another example, the flat surface 58 may be proximate a center 62 of the airfoil 36, as shown best in FIG. 6. The oblique surface 60 may descend from the flat surface 58 in the center 62 to the first side 48 at the clearance angle α, and the tip 46 may include a second oblique surface 64 descending from the flat surface 58 in the center 62 to the second side 50 of the airfoil 36 at a second clearance angle β. The clearance angle α of the oblique surface 60 and the clearance angle β of the second oblique surface 64 may be equal to each other, or the clearance angles α and β may be of varying degrees, as well.

Figure 7:
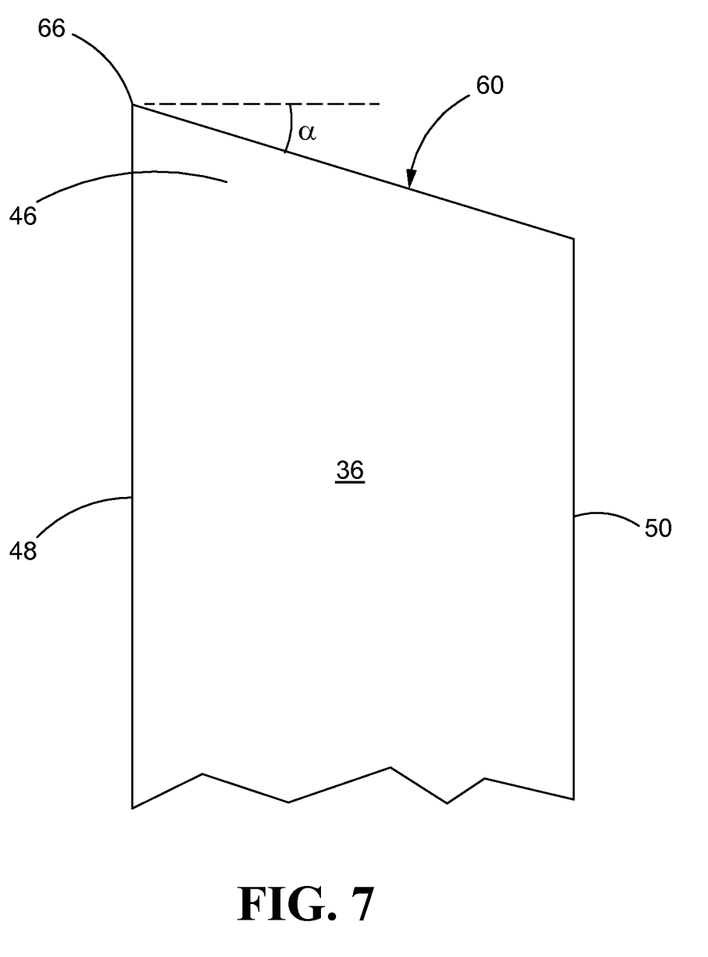
FIG. 7 is a cross-sectional view of an airfoil according to another embodiment of the present disclosure.

As shown best in FIG. 7, the tip 46 may not include the flat surface 58 and may solely comprise the oblique surface 60 angled away from the fan case 38 or engine casing 32, depending on the strength and hardness of the tip 46. For example, the oblique surface 60 may directly descend from the first side 48 to the second side 50 at the clearance angle α, with an apex 66 of the tip 46 lying on the first side 48. In sealing contact with the abradable seal 42 on the fan case 38 or engine casing 32, the apex 66 may abrade the seal 42 during operation, while the oblique surface 60 minimizes frictional heating between the tip 46 and seal 42. The apex 66 may be in the form of a small fillet instead of a sharp edge.

Figure 8:
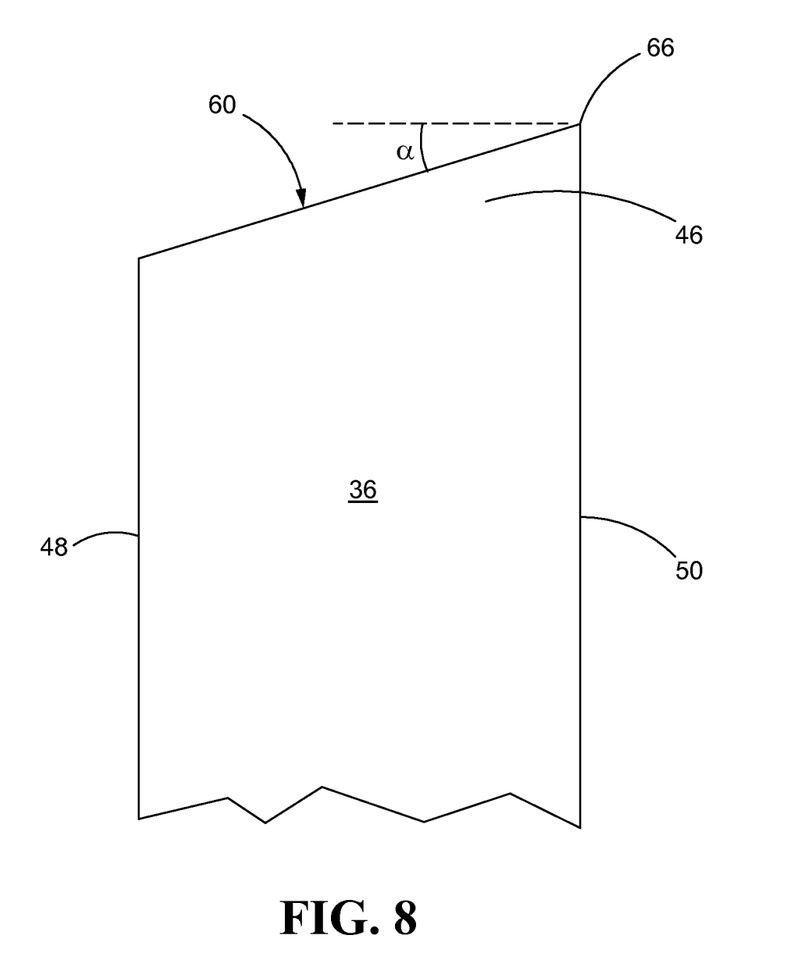
FIG. 8 is a cross-sectional view of an airfoil according to another embodiment of the present disclosure.
Figure 9:
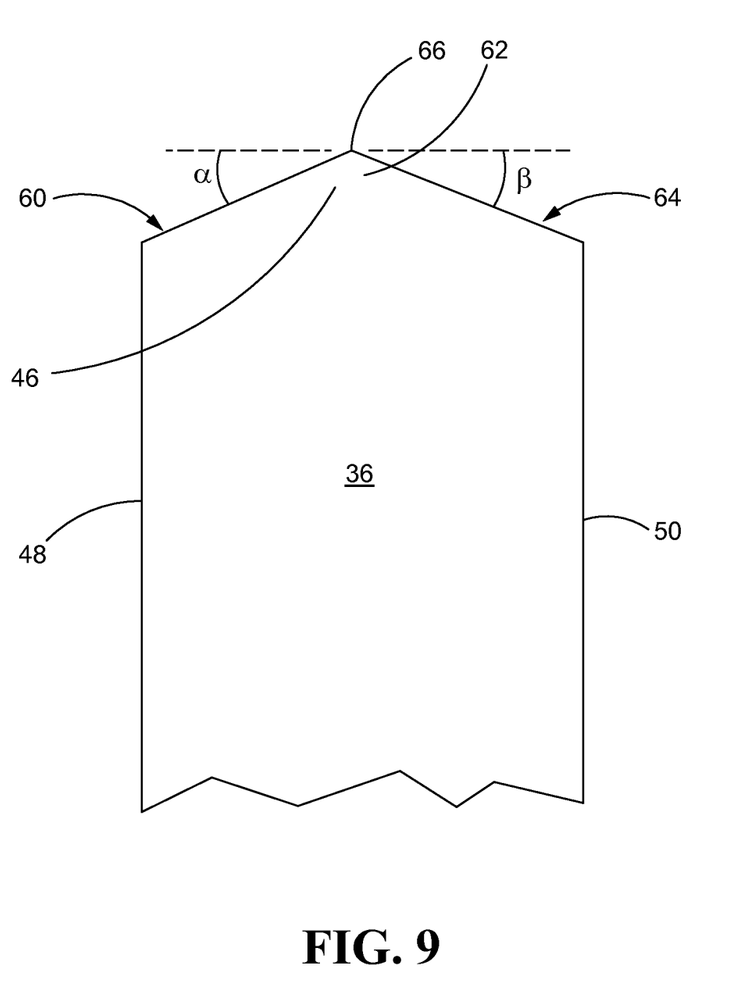
FIG. 9 is a cross-sectional view of an airfoil according to another embodiment of the present disclosure.

In another example shown best in FIG. 8, the apex 66 may lie on the second side 50, and the oblique surface 60 may directly descend from the second side 50 to the first side 48 at the clearance angle α. Alternatively, the apex 66 may lie on the center 62 of the airfoil, as shown best in FIG. 9, with the oblique surface 60 descending from the center 62 to the first side 48 at the clearance angle α, and the second oblique surface 64 descending from the center 62 to the second side 50 at the clearance angle α. It is to be understood that various alternative configurations for the cutting tool tip 46 than that shown in FIGS. 3-9 are certainly possible. For example, the apex 66 may be in the form of a small fillet instead of a sharp edge.

In addition, the flat surface 58, oblique surfaces 60, 64 and/or apex 66 may undergo treatment for increased wear resistance, including but not limited to, anodizing, micro arc oxidation, cathodic arc deposition, and the like. In so doing, the flat surface 58, oblique surfaces 60, 64 and/or apex 66 may include a hard plating (e.g., erosion resistant polyurethane coating, nickel plating, aluminum oxide plating, and the like) that reinforces a strength of the tip 46 when rotating against the abradable seal 42.

Figure 10:
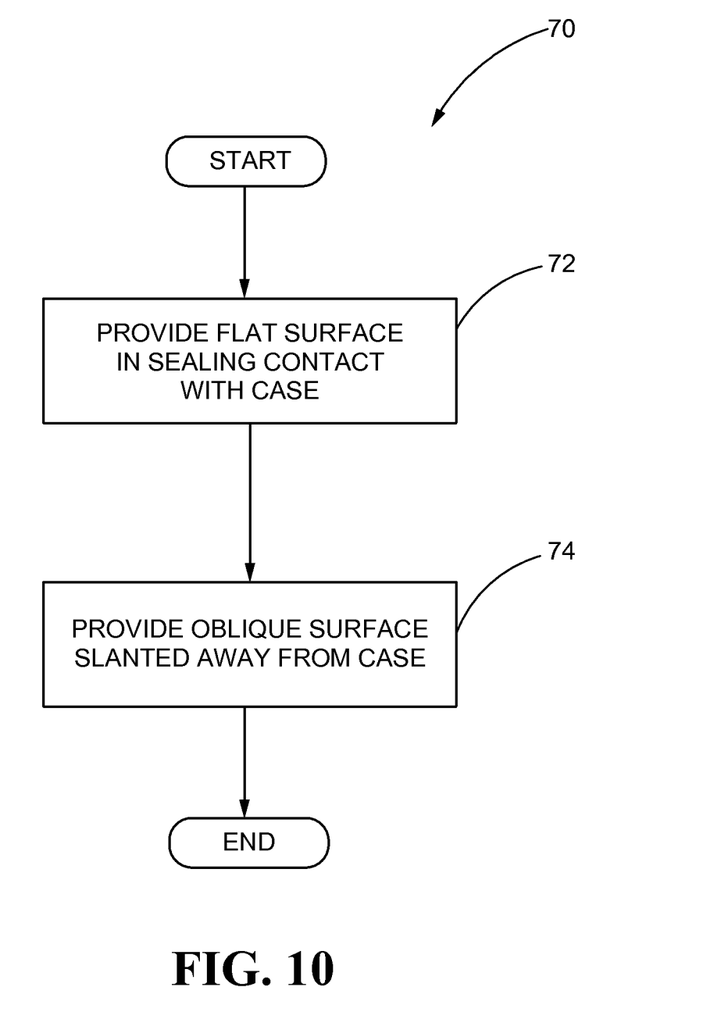
FIG. 10 illustrates an exemplary process for reducing frictional heating between airfoils and a case of a gas turbine engine, according to another embodiment of the present disclosure.

Turning now to FIG. 10, with continued reference to FIGS. 1-9, a flowchart outlining a method 70 for reducing frictional heating between airfoils 36 and the casing 32 of the gas turbine engine 20 is shown, according to another embodiment of the present disclosure. At a block 72, the flat surface 58 may be provided on the tip 46 of each of the airfoils 36 in sealing contact with the casing 32. At a block 74, the oblique surface 60 may be provided on the tip 46 of each of the airfoils 36. The oblique surface 60 may be slanted away from the casing 32, such as at the clearance angle α. Furthermore, the oblique surface 60 may descend from the flat surface 58. For example, the flat and/or oblique surfaces 58, 60 may be provided via milling, machining, and other cutting procedures.

Industrial Applicability

From the foregoing, it can be seen that the teachings of this disclosure can find industrial application in any number of different situations, including but not limited to, gas turbine engines. Such engines may be used, for example, on aircraft for generating thrust, or in land, marine, or aircraft applications for generating power.

The present disclosure provides an airfoil design and method for reducing frictional heating between airfoils and a casing of a gas turbine engine. By configuring the tip of the airfoil to be a cutting tool against the rub strip or abradable seal of the engine casing, frictional heating is significantly reduced. More specifically, the tip may include a flat surface in contact with the coating and an oblique surface that is angled away from the engine casing at a clearance angle.

In sealing contact with the coating, the flat surface of the tip may minimize a clearance distance between the airfoil and the casing, thereby optimizing fuel performance and engine efficiency. In addition, the clearance angle and oblique surface of the blade tip reduce the surface area in contact with the coating and allow rub strip material to exit, thereby lowering heat generation when the airfoils rotate against the rub strip. By lowering heat generation between the airfoils and casing, degradation of the polyurethane erosion resistant coating on the airfoil tips may be reduced or eliminated. Furthermore, preventing the erosion resistant coating on the airfoil tips from peeling off provides cost saving benefits, such as, during maintenance procedures.

While the foregoing detailed description has been given and provided with respect to certain specific embodiments, it is to be understood that the scope of the disclosure should not be limited to such embodiments, but that the same are provided simply for enablement and best mode purposes. The breadth and spirit of the present disclosure is broader than the embodiments specifically disclosed, and includes all embodiments and equivalents encompassed within the claims appended hereto as well.

What is claimed is:

1. An airfoil for a gas turbine engine, comprising:
 a pressure side; and
 a suction side opposite the pressure side, the pressure side and the suction side extending axially from a leading edge to a trailing edge and radially from a base to a tip, the tip including a flat surface a first oblique surface descending directly from the flat surface towards the pressure side at a first clearance angle and a second oblique surface and a second oblique surface descending directly from the flat surface toward the suction side at a second clearance angle different from the first clearance angle;
 wherein a circumferential width of the flat surface varies along its length; and
 wherein the flat surface extends only partially between the leading edge to the trailing edge, such that proximate the leading edge and the trailing edge, there is no flat surface.

2. The airfoil of claim 1, wherein a width of the flat surface is at least 2.54 mm (0.1 in).

3. The airfoil of claim 1, wherein the first clearance angle of the first oblique surface is between zero to five degrees (0-5°).

4. A gas turbine engine, comprising:
a fan section;
a compressor section downstream of the fan section;
a combustor section downstream of the compressor section; and
a turbine section downstream of the combustor section, at least one of the fan section, compressor section, and the turbine section including:
 a rotor,
 a plurality of airfoils extending radially from the rotor, and
 a fan case surrounding the rotor and the plurality of airfoils, each of the plurality of airfoils having a tip extending between a pressure side, a suction side, a leading edge, and a trailing edge, the tip including:
  a flat surface facing the fan case, and
  a first oblique surface directly adjacent to the flat surface and extending toward the pressure side at a first oblique angle angled away from the fan case, and a second oblique surface directly adjacent to the flat surface and extending toward the suction side at a second oblique angle different from the first oblique angle;
  wherein a circumferential width of the flat surface varies along its length; and
  wherein the flat surface extends only partially between the leading edge to the trailing edge, such that proximate the leading edge and the trailing edge, there is no flat surface.

5. The gas turbine engine of claim 4, wherein the flat surfaces of the tips of the airfoils and the fan case are in sealing contact.

6. The gas turbine engine of claim 4, wherein the oblique surfaces of the tips of the airfoils reduce frictional heating between the airfoils and the fan case during operation.

7. The gas turbine engine of claim 4, wherein the fan case includes an abradable seal on an inner surface of the fan case.

8. The gas turbine engine of claim 7, wherein the flat surface and the oblique surface on the tip of each of the airfoils are designed to cut through the abradable seal of the fan case.

9. The gas turbine engine of claim 4, wherein the flat surface and the oblique surface of each of the tips of the airfoils undergo treatment for increased wear resistance.

10. A method for reducing frictional heating between airfoils and a casing of a gas turbine engine, the method comprising:
 providing a flat surface on a tip of each of the airfoils, the flat surface in sealing contact with the casing;
 providing a first oblique surface on the tip of each of the airfoils, the first oblique surface slanted away from the casing and descending directly from the flat surface towards the pressure side at a first clearance angle;
 providing a second oblique surface on the tip of each of the airfoils, the second oblique surface slanted away from the casing and descending directly from the flat surface towards the suction side at a second clearance angle different from the first clearance angle; and
 operating the gas turbine engine using the oblique surfaces;
 wherein a circumferential width of the flat surface varies along its length; and
 wherein the flat surface extends only partially between a leading edge to a trailing edge of the airfoil, such that proximate the leading edge and the trailing edge, there is no flat surface.

* * * * *